(12) United States Patent
Hsieh et al.

(10) Patent No.: US 6,664,503 B1
(45) Date of Patent: Dec. 16, 2003

(54) METHOD FOR MANUFACTURING A MAGNETIC DISK

(75) Inventors: John Hsieh, San Jose, CA (US); Andrew Homola, Morgan Hill, CA (US); David Vigdor Salamon, San Jose, CA (US); Holland Hodges, Dublin, CA (US); Christopher H. Bajorek, Los Gatos, CA (US)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/407,630

(22) Filed: Sep. 28, 1999

Related U.S. Application Data

(63) Continuation-in-part of application No. 09/391,139, filed on Sep. 7, 1999.

(51) Int. Cl.[7] .............................................. B23K 15/00

(52) U.S. Cl. .............. 219/121.72; 438/460; 219/121.68

(58) Field of Search ................................. 438/460–463; 216/17, 22, 31, 65; 219/121.69, 121.72, 121.68; 65/112; 225/2

(56) References Cited

U.S. PATENT DOCUMENTS

| | | | |
|---|---|---|---|
| 3,453,097 A | 7/1969 | Hafner | 65/112 |
| 3,695,497 A | 10/1972 | Dear | 225/2 |
| 3,695,498 A | 10/1972 | Dear | 225/1 |
| 3,730,408 A | 5/1973 | Dahlberg et al. | 225/2 |
| 3,740,524 A | 6/1973 | Dahlberg et al. | 219/121 LM |
| 3,790,362 A | 2/1974 | Dahlberg et al. | 65/174 |
| 4,113,162 A | 9/1978 | Boehm et al. | 225/2 |
| 4,190,184 A | 2/1980 | Oelke et al. | 225/2 |
| 4,325,182 A | 4/1982 | Tefft et al. | 29/583 |
| 4,468,534 A | 8/1984 | Boddicker | 219/121 |
| 4,833,001 A | 5/1989 | Kijima et al. | 428/141 |
| 5,040,342 A | 8/1991 | McGuire et al. | 51/282 |
| 5,084,604 A | 1/1992 | Dekker et al. | 219/121.72 |

(List continued on next page.)

FOREIGN PATENT DOCUMENTS

| | | |
|---|---|---|
| DE | 4214159 C1 | 11/1993 |
| DE | 19715537 A1 | 10/1997 |
| EP | 0872303 A2 | 10/1998 |
| EP | 0903327 A3 | 7/1999 |
| JP | 7-223828 | 8/1995 |
| JP | 7-323384 | 12/1995 |
| JP | 7-323385 | 12/1995 |
| JP | 9-118535 | 5/1997 |
| JP | 10-291084 | 11/1998 |
| RU | 1231813 A1 | 4/1991 |
| WO | WO 98/17434 | 4/1998 |

OTHER PUBLICATIONS

Zero Width Cutting Technology.
Teng, et al., "Laser Zone Texture on Alternative Substrate Disks", IEEE Transactions on Magnetics, Sep. 1996, pp. 3759–3761.
Kuo, et al., "Laser Zone Texturing on Glass and Glass–Ceramic Substrates", IEEE Transactions on Magnetics, Jan. 1999, pp. 944–949.

*Primary Examiner*—Gregory Mills
*Assistant Examiner*—Sylvia R MacArthur
(74) *Attorney, Agent, or Firm*—Oblon, Spivak, McClelland, Maier & Neustadt, P.C.

(57) ABSTRACT

A method for manufacturing a magnetic disk comprises the step of applying a continuous laser beam to both sides of a glass workpiece and etching both sides of the workpiece with an aqueous acidic fluoride-containing etching solution. The portion of the workpiece receiving the laser beam etches at a much faster rate than the portions of the workpiece that were not exposed to the laser beam. The workpiece is then broken along a line or curve formed by the above-mentioned steps. The resulting structure is a substrate used to form a magnetic disk. The disk is completed by depositing an underlayer, a magnetic layer and a protective overcoat on the substrate.

14 Claims, 8 Drawing Sheets

U.S. PATENT DOCUMENTS

| | | |
|---|---|---|
| 5,087,481 A | 2/1992 | Chen et al. ................... 427/129 |
| 5,132,505 A | 7/1992 | Zonneveld et al. ...... 219/121.6 |
| 5,138,131 A | 8/1992 | Nishikawa et al. .... 219/121.67 |
| 5,185,295 A * | 2/1993 | Goto et al. ................... 438/463 |
| 5,254,833 A | 10/1993 | Okiyama ............... 219/121.68 |
| 5,314,522 A | 5/1994 | Kondo et al. ................... 65/31 |
| 5,332,411 A | 7/1994 | Ogata et al. ................. 65/60.1 |
| 5,609,284 A | 3/1997 | Kondratenko .................. 225/1 |
| 5,622,540 A | 4/1997 | Stevens ........................ 65/112 |
| 5,776,220 A | 7/1998 | Allaire et al. .................. 65/112 |
| 5,826,772 A | 10/1998 | Ariglio et al. .................. 225/2 |
| 5,888,883 A | 3/1999 | Sasaki et al. ............... 438/460 |
| 5,926,352 A | 7/1999 | Murayama et al. ......... 360/135 |
| 5,968,382 A * | 10/1999 | Matsumoto et al. ... 219/121.72 |
| 5,972,816 A | 10/1999 | Goto ............................. 501/4 |
| 5,984,159 A | 11/1999 | Ostendarp et al. ......... 225/93.5 |

* cited by examiner

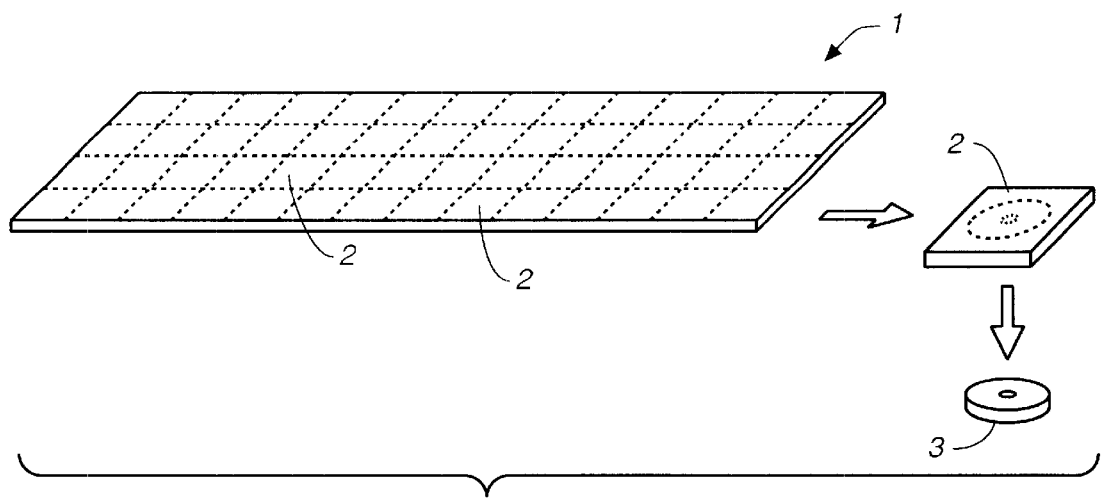
FIG._1
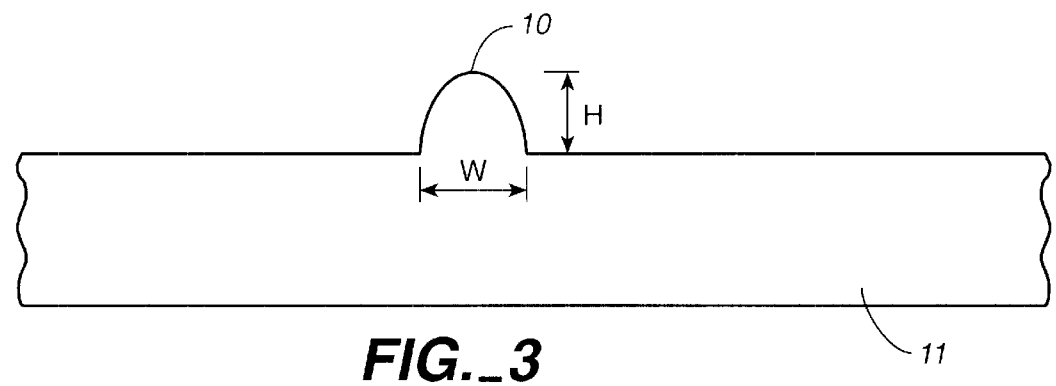
FIG._3
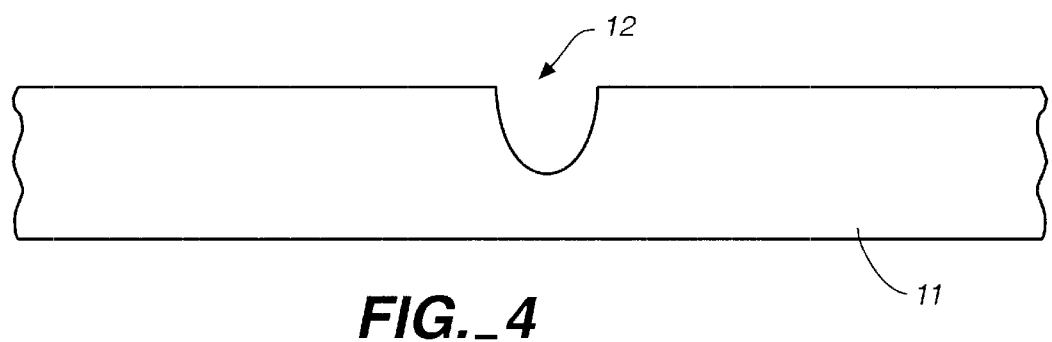
FIG._4

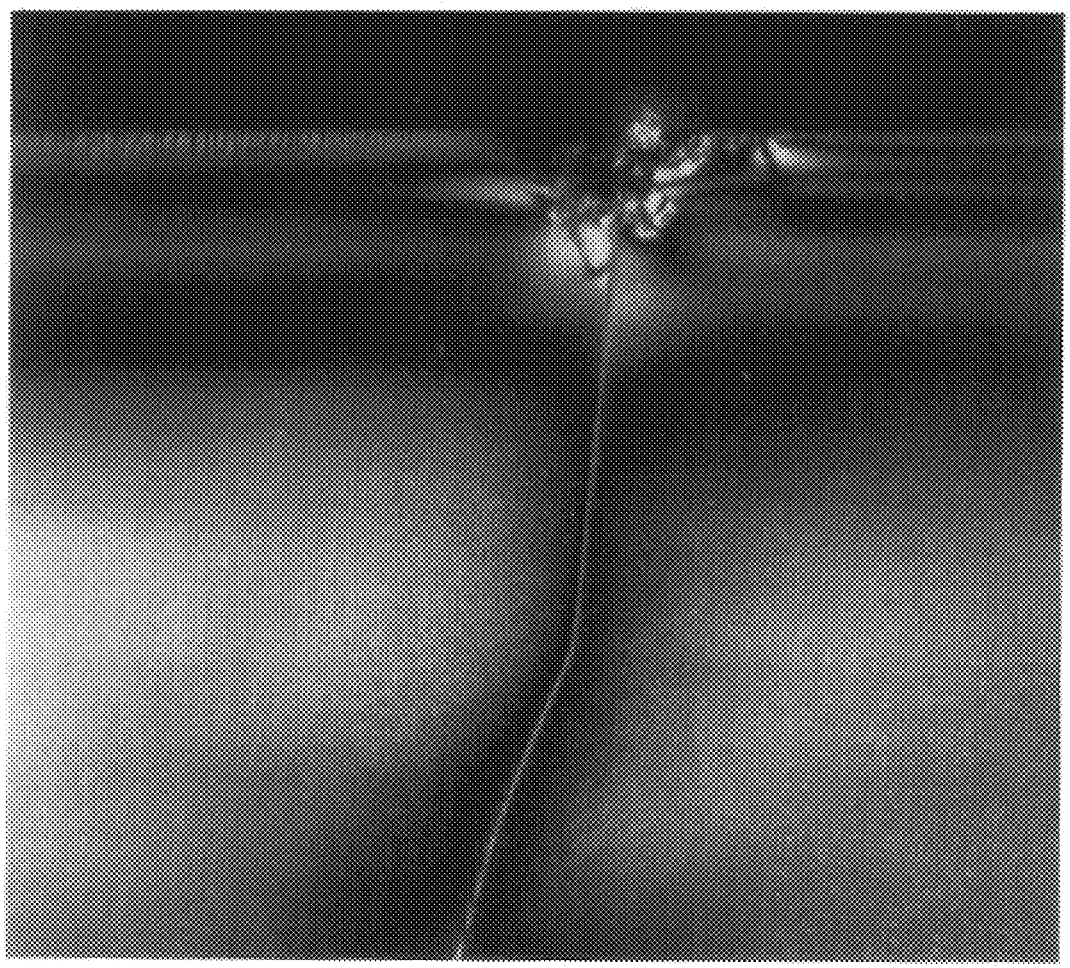
FIG._2

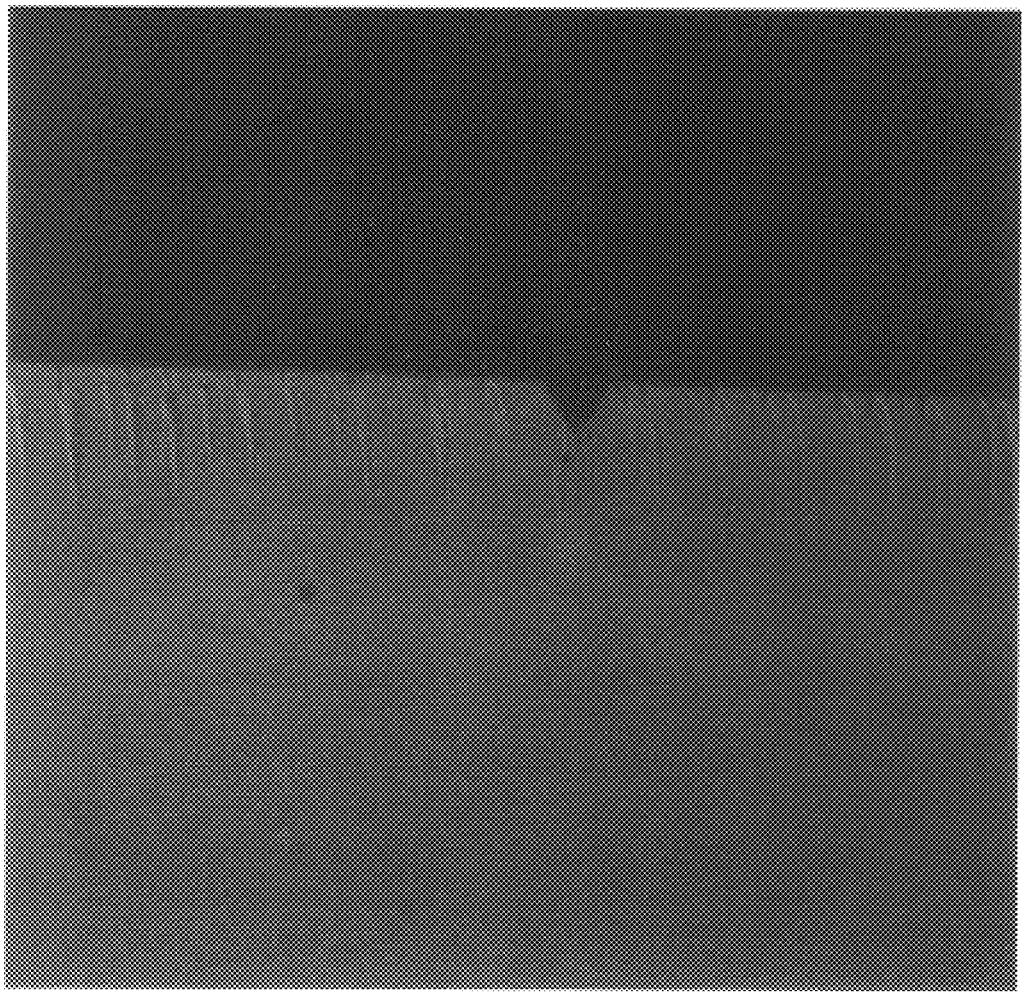
FIG._5

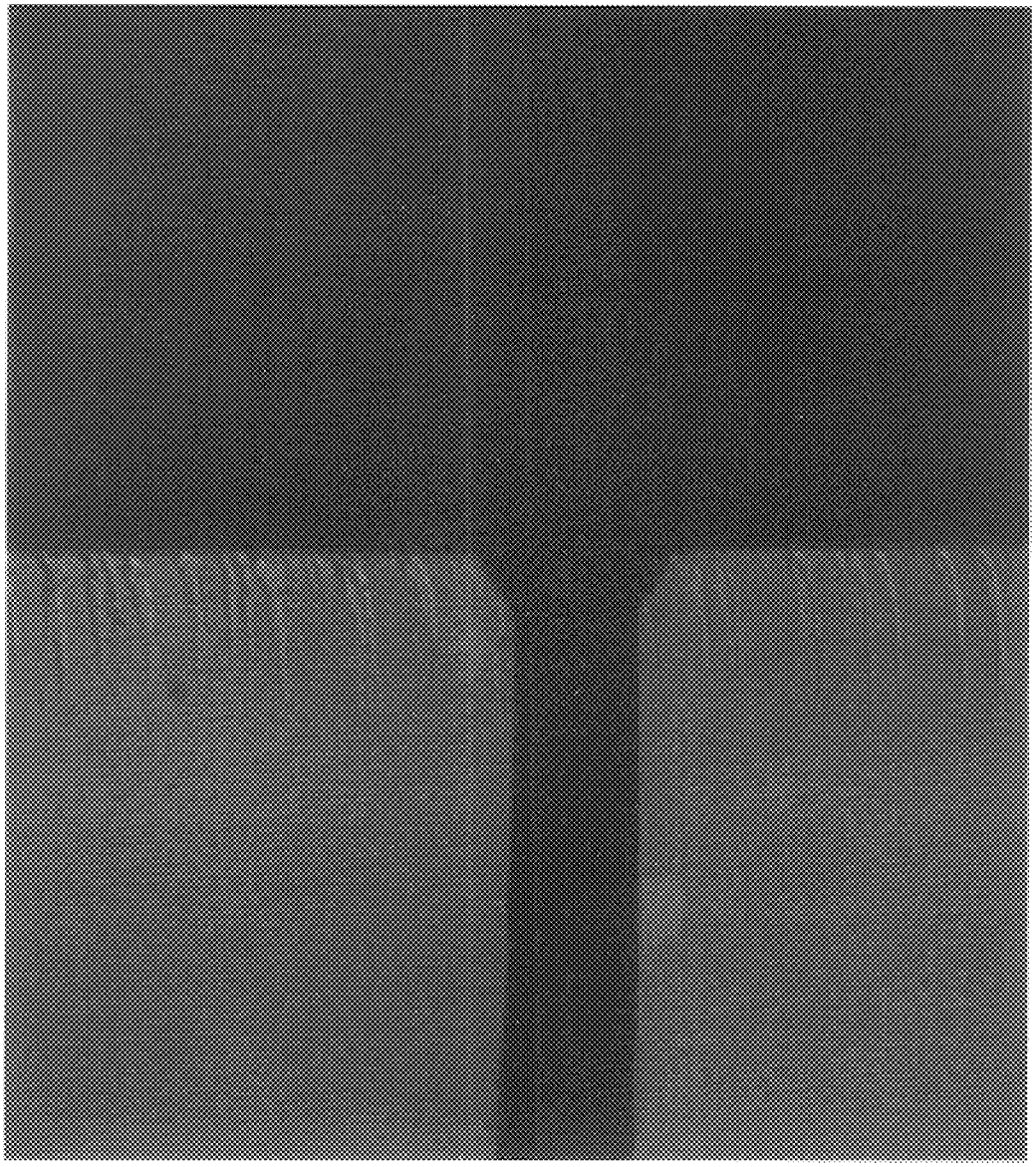
FIG._6

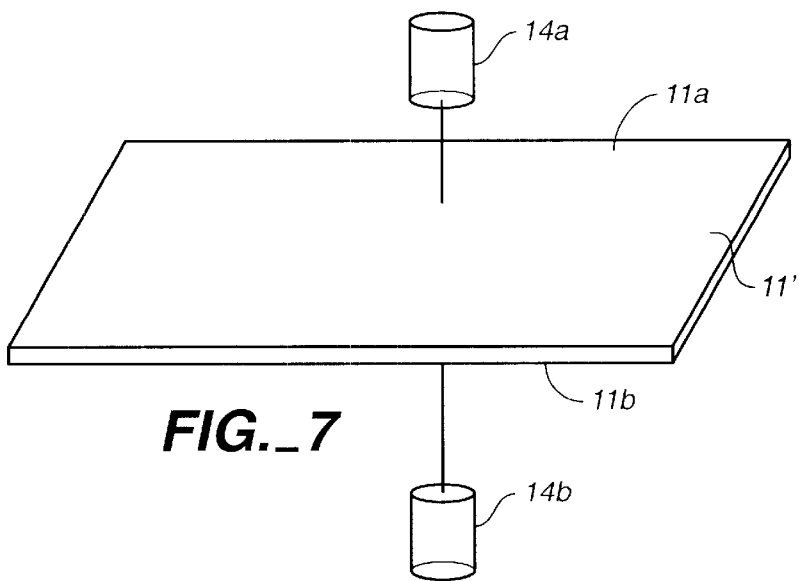
FIG._7
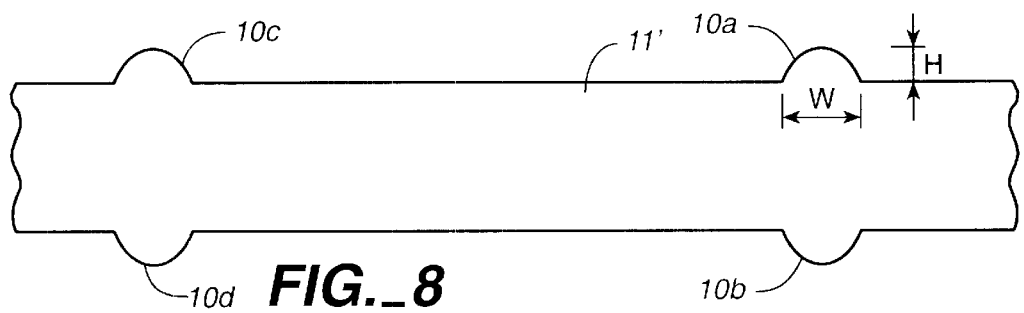
FIG._8
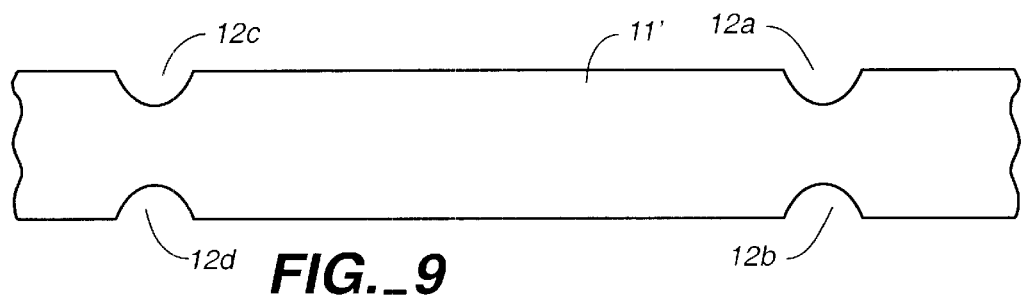
FIG._9
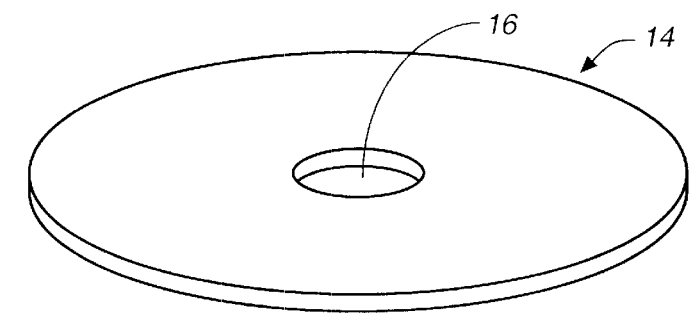
FIG._10

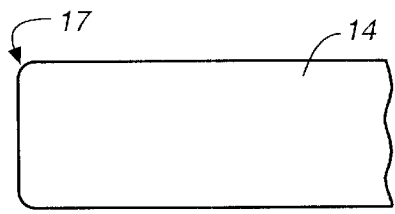
FIG._10A
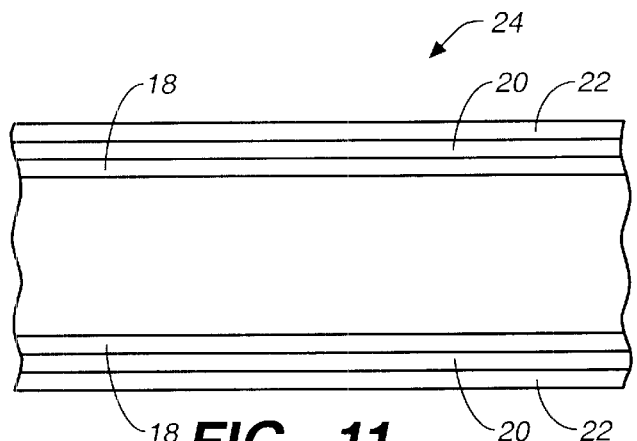
FIG._11
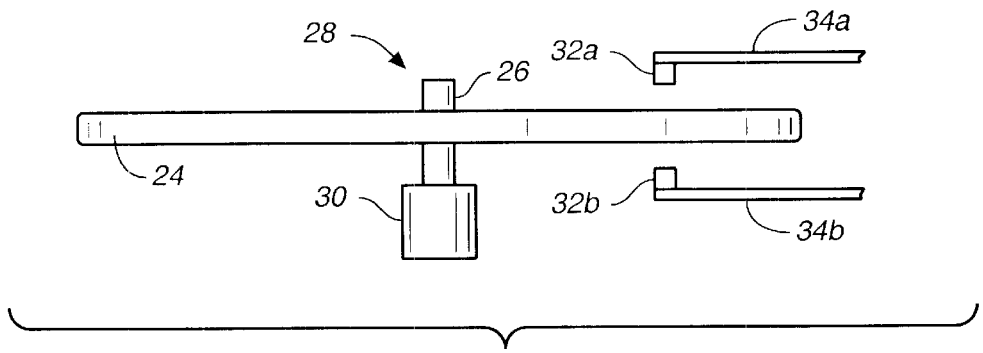
FIG._12
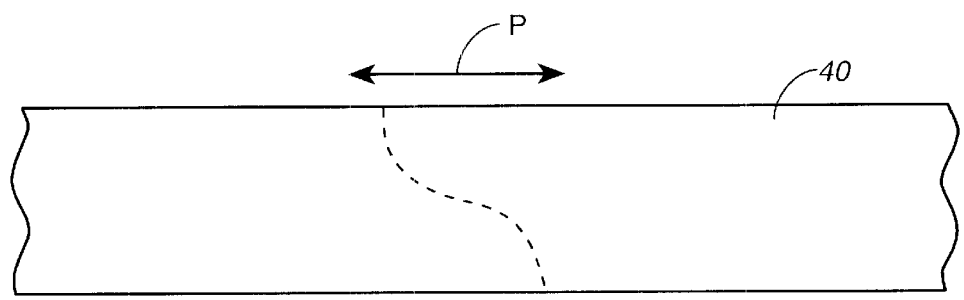
FIG._13

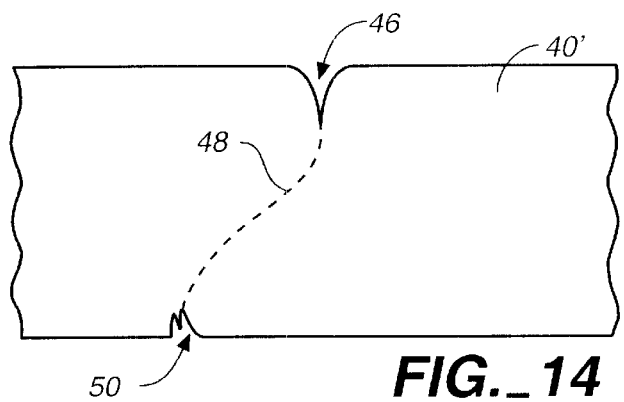
*FIG._14*
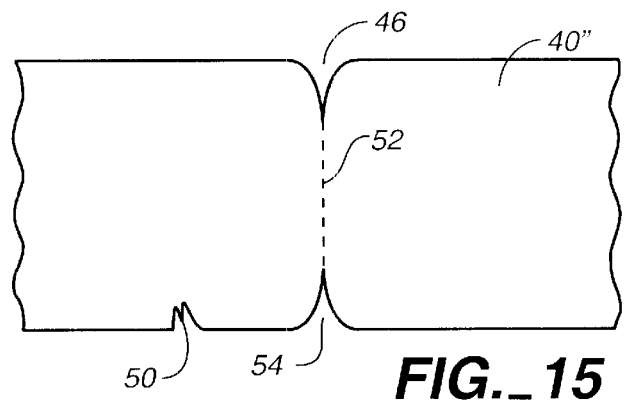
*FIG._15*
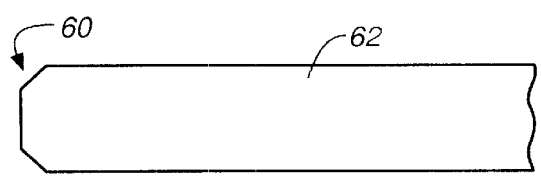
*FIG._16*
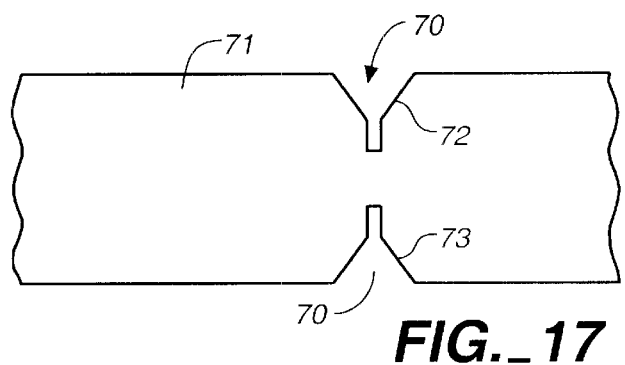
*FIG._17*

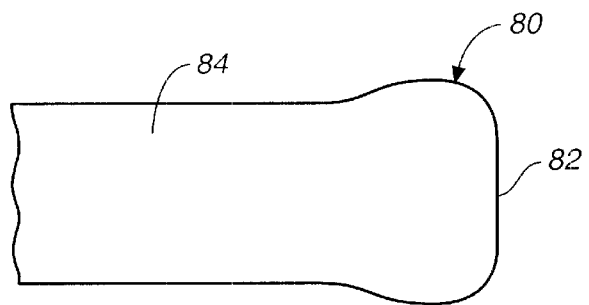
*FIG._18*
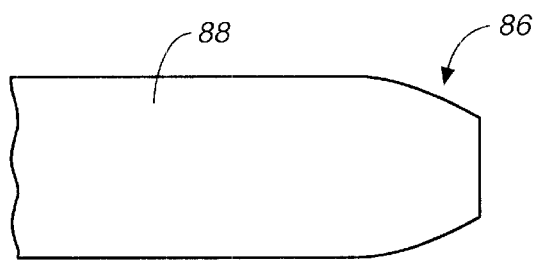
*FIG._19*
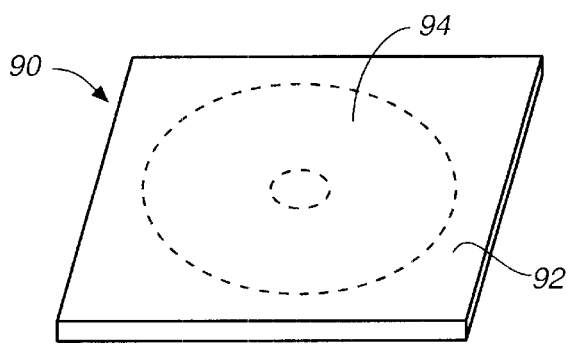
*FIG._20*
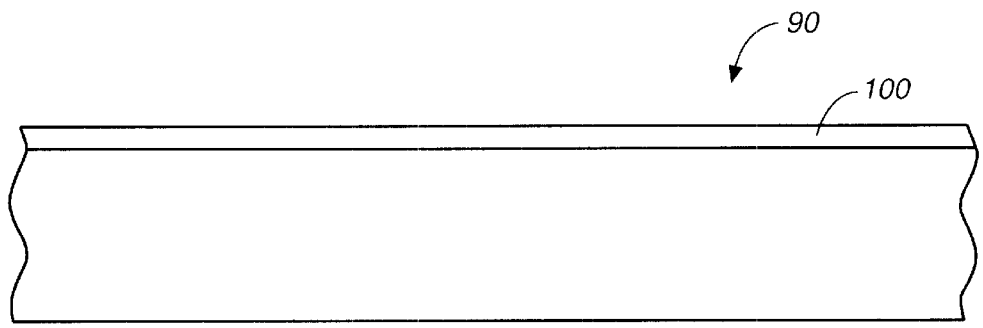
*FIG._21*

METHOD FOR MANUFACTURING A MAGNETIC DISK

This application is a continuation in part of U.S. patent application Ser. No. 09/391,139, filed by Hsieh et al. on Sep. 7, 1999, incorporated herein by reference.

This application incorporates by reference U.S. patent application Ser. No. 09/390,887, entitled "Texturing of a Landing Zone on Glass-Based Substrates by a Chemical Etching Process", filed by Andrew Homola Sep. 7, 1999.

This application also incorporates herein by reference U.S. patent application Ser. No. 09/391,140, entitled "Method for Manufacturing a Magnetic Disk Including a Glass Substrate and the Resulting Substrate" filed by Homola et al. on Sep. 7, 1999.

BACKGROUND OF THE INVENTION

This invention pertains to methods for cutting glass. This invention also pertains to methods for manufacturing magnetic disks comprising glass substrates. This invention also pertains to methods for making glass substrates used in the manufacture of magnetic disks. However, the invention has broad applications, both in the magnetic disk industry and outside the disk industry.

It is known in the art to use glass as a substrate material to manufacture magnetic disks. During substrate manufacturing, disk-shaped substrates are cut out of a sheet or square of glass. This is typically accomplished by providing a sheet 1 of glass (FIG. 1), and cutting sheet 1 into squares 2 of glass. Thereafter, glass substrates 3 are cut out of squares 2. Unfortunately, it is notoriously difficult to cut and shape glass due to its brittle nature. Glass is typically cut by scribing and breaking. (Scribing is accomplished using either diamond or laser scribing. The scribe marks are shown in FIG. 1 as dotted lines.) After scribing and breaking, the edges of the glass substrate have the following problems.

1. It is difficult or impossible to control the exact position of the point at which the glass breaks. Although the break point will originate at the scribe mark, the break will tend to propagate along portions of the glass where defects or voids exist. Because of this, the location of the edge of the resulting glass substrate is imprecise.
2. Breaking the glass substrate leaves irregular and sharp edges that are unaesthetic, fragile, and makes the substrate hazardous to handle.
3. After scribing and breaking, the glass material at the edge of the substrate contains defects from which cracks can propagate, thereby damaging or destroying the substrate or a disk manufactured from the substrate. The poor edge condition thus weakens the substrate.
4. Chips from the sharp edges of the glass can strike or lodge on the surface of the substrate and cause damage that must be removed by expensive polishing processes.

FIG. 2 is a cross section photograph showing the edge damage that can result from mechanically scribing and breaking a glass substrate. As can be seen, FIG. 2 shows chipping and irregular propagation of the crack formed during breaking. Accordingly, after such scribing and breaking, it is necessary to grind and then polish the edges of the glass. Such polishing adds a large expense to the disk manufacturing process, thereby tending to make glass substrates less practical.

SUMMARY

During a method in accordance with the invention, a laser beam is applied to a glass workpiece and then the workpiece is etched. The etch rate of the portion of the workpiece exposed to the laser is greater than the etch rate of other portions of the workpiece. Thus, during etching, a groove is formed in the portion of the workpiece that has been exposed to the laser beam. After etching, the workpiece is separated into separate pieces along the groove. The edge of the separate pieces is smoother and more precisely controlled than workpieces cut using conventional scribing and breaking processes. Accordingly, less or no edge polishing is required after a process in accordance with the invention compared to prior art scribing and breaking processes.

In one embodiment, etching is accomplished with an acidic solution comprising fluoride ions. For example, the solution can be an aqueous solution comprising ammonium bifluoride and sulfuric acid. Alternatively, the solution can comprise phosphoric acid and ammonium bifluoride. In yet another embodiment, the solution is an HF solution.

As mentioned above, the etching solution preferentially attacks the portion of the glass where the laser has been applied. (It is not certain why the portion of the glass that has been exposed to the laser preferentially etches. It is believed that this portion of the glass undergoes some kind of structure change, e.g., the glass becomes less dense and is therefore easier to etch. It might also be that the increase in etch rate is due to residual stresses in the portion of the glass exposed to the laser.)

In one embodiment, the glass is in the form of a flat sheet. (This sheet can have any appropriate shape, e.g. a rectangle.) A laser beam is applied to both sides of the sheet. Thereafter, the sheet is subjected to the above-mentioned etchant, which forms grooves where the sheet has been exposed to the laser. The glass sheet is then broken at the grooves. As mentioned above, the edges of the resulting pieces of glass are smoother and more precisely positioned than the edges of a glass sheet subjected to a prior art scribe and break process.

In one embodiment, the glass is cut into substrates used in the manufacture of magnetic disks. The substrates are then processed into magnetic disks, e.g. by depositing appropriate layers on the substrate. In one embodiment, an underlayer, a magnetic layer and a protective overcoat are formed on one or both sides of the substrate, e.g. by a vacuum deposition process such as sputtering.

In another embodiment of the invention, instead of using glass, other silica containing materials are used, e.g. glass ceramic or crystalline silica such as quartz. In other embodiments, other materials are used that have the characteristic that after exposure to a laser beam they etch faster. (When using these other materials, other appropriate etchants can be used.) Regions of these materials typically expand when exposed to the laser beam and remain that way upon cooling.

In another embodiment, instead of using a laser, other forms of concentrated radiant energy are used, e.g. highly focused, intense light, infrared radiation, or other form of electromagnetic radiation.

BRIEF DESCRIPTION OF THE DRAWINGS

FIG. 1 schematically shows a glass sheet being cut into individual glass squares, and then being cut into individual glass substrates.

FIG. 2 is a photograph of the edge of a piece of glass after conventional scribing and breaking in accordance with the prior art.

FIG. 3 schematically illustrates a ridge formed on a glass workpiece by applying a continuous laser beam to the workpiece.

FIG. 4 schematically illustrates a groove etched into the workpiece after the workpiece has been subjected to the laser beam.

FIG. 5 is a photograph of a groove formed in a glass workpiece by etching the workpiece after it was exposed to a laser beam.

FIG. 6 is a photograph of a workpiece that has been separated into two pieces using a method in accordance with the invention.

FIG. 7 illustrates a glass workpiece exposed to laser beams during a method in accordance with the invention.

FIG. 8 illustrates in cross section a glass workpiece after both sides of the workpiece have been exposed to a laser beam.

FIG. 9 illustrates the workpiece of FIG. 8 after it has been subjected to an etching process.

FIG. 10 illustrates a magnetic disk substrate.

FIG. 10A illustrates the edge of the substrate of FIG. 10.

FIG. 11 Illustrates in cross section a portion of a magnetic disk manufactured using the substrate of FIG. 10.

FIG. 12 illustrates a disk drive incorporating the disk of FIG. 11.

FIG. 13 illustrates a workpiece being broken after laser scribing.

FIG. 14 illustrates a workpiece being broken after one side of the workpiece has been subjected to a laser beam and etching.

FIG. 15 illustrates a workpiece being broken after both sides of the workpiece have been subjected to a laser beam and etching.

FIG. 16 illustrates a chamfered edge of a substrate.

FIG. 17 illustrates a method for manufacturing a chamfered edge in accordance with the invention.

FIG. 18 illustrates an undesired "ski-jump" profile at the edge of a substrate.

FIG. 19 illustrates an undesired "roll-off" profile at the edge of a substrate.

FIG. 20 illustrates a glass square.

FIG. 21 illustrates a glass workpiece covered with a protective layer.

DETAILED DESCRIPTION

A method in accordance with the invention comprises the step of cutting a workpiece into smaller sections by applying concentrated radiant energy such as a laser beam to the workpiece and then etching the workpiece. The workpiece is typically a silica-containing material such as glass or glass ceramic. If the workpiece is glass, it is typically a silica containing glass such as borosilicate glass, aluminosilicate glass, or other type of glass. In one embodiment of the invention, a laser is applied to both sides of the workpiece prior to etching.

The laser beam typically has a wavelength of 2 to 10.6 microns or greater. These wavelengths are easily absorbed by silica-containing materials. The power density provided by the laser is between 0.5 and 50 W/cm$^2$. The scribing speed typically depends on the power density and the workpiece thickness. With this range of power densities, scribing speeds of 0.1 to 1 m/s are easily achievable. The higher the scribing speed, the higher the power density required. The spot size of the laser beam at the surface of the workpiece is typically between a few microns and a few millimeters, and in one embodiment between a few tens of microns and a few millimeters. The laser beam is typically generated by a $CO_2$ laser for a wavelength of 10.6 microns, but other types of lasers can be used as well. (See, for example, the U.S. Pat. No. 5,776,220, incorporated herein by reference, which describes various types of lasers at col. 4, lines 10–22. In yet another embodiment, the laser can be device model no. SBM777 or SBM333, available from PTG Precision Technology Center, Lake Mary, Fla. The beam parameters used with these lasers can be those previously used to generate scribe lines.) Preferably, the laser produces light having a wavelength that is strongly absorbed by the workpiece.

In some embodiments in which the workpiece comprises glass, the laser does not heat the glass above its glass transition or softening temperature. Rather, the substrate is preferably heated to a temperature that is below the glass transition or softening temperature but that is also sufficient to cause the change in the substrate's properties described herein.

Applying the laser beam to a glass workpiece results in the formation of a ridge such as ridge 10 on glass workpiece 11 (FIG. 3). The height H and width W of ridge 10 depend upon the laser parameters, e.g. the size of the laser beam and the power of the laser beam.

After forming ridge 10, workpiece 11 is subjected to an etching process. In one embodiment, etching is accomplished using an aqueous acidic solution comprising fluoride ions. Examples of solutions that can be used include HF solutions, a solution comprising ammonium bifluoride and phosphoric acid, or a solution comprising ammonium bifluoride and sulfuric acid. (HF is hazardous to humans. Therefore, other acidic fluoride-containing materials may be preferable to HF.)

One example of an etching solution comprises 5 wt. % ammonium bifluoride and 5% by volume of $H_2SO_4$ at room temperature. A surfactant such as toluene sulfonic acid can be used. This material is sold as Eltesol TSX/A, manufactured by Albright & Wilson Corp. The etching solution is typically ultrasonically agitated, e.g. at a frequency up to 68 KHz, e.g. between 28 KHz and 68 KHz. In one embodiment, the etching solution is agitated at 40 KHz.

The above-mentioned solution preferentially attacks glass that has been subjected to the laser beam. The exposed portions of the glass etch at rates of up to 300 nm/minute, which is about ten times faster than the etch rate of the unexposed portions of the glass. Thus, the portion of workpiece 11 where ridge 10 is formed etches more rapidly than the rest of workpiece 11, e.g. by about a factor of 10. FIG. 4 illustrates a groove 12 formed in workpiece 11 by the etching solution where bump 10 was previously formed.

While FIGS. 3 and 4 schematically illustrate the phenomenon exploited to cut glass, FIG. 5 is a photomicrograph of a groove formed by etching a substrate after exposure to a laser. The groove is formed where a ridge used to be. Since etching is a chemical process that occurs at the atomic level, the etched surfaces of the groove are nearly atomically smooth and without microcracks such as those formed by mechanical scribing. FIG. 6 is a photomicrograph of the workpiece after it has been separated into two pieces at the groove. The edges of the two pieces are substantially smooth.

Manufacture of a Magnetic Disk Using the Novel Method of the Present Invention In one embodiment, the above-described phenomenon is exploited to cut glass workpiece 11 into different regions of glass, e.g. glass substrates used in the manufacture of a magnetic disk. Referring to FIG. 7, in one embodiment, $CO_2$ lasers 14a, 14b apply continuous laser beams to both sides 11a, 11b of workpiece 11' while workpiece 11' is rotated in direction A, thereby forming ridges 10a, 10b (FIGS. 7 and 8) on the top and bottom of workpiece 11'. (During this process, workpiece 11' is typically mounted on a spindle that rotates workpiece 11'.) Workpiece 11' is typically a smooth glass square about 1mm thick. Workpiece 11' is cut from a glass sheet formed by the float method, and is typically unpolished. Alternatively workpiece 11' could be formed by drawing or pressing.

Although FIG. 7 shows two lasers for applying a laser beam to workpiece 11', in another embodiment, a single laser provides a laser beam to a beam splitter. The beam is split into two beams, one being applied to one side of workpiece 11', and the other being applied to the other side of workpiece 11'. This is done using apparatus similar to that described in U.S. patent application Ser. No. 08/654,452, filed by Treves et al. on May 28, 1996, incorporated herein by reference.

Mounting workpiece 11' so that it rotates about an axis during exposure to laser beams provides the following important advantages:

1. This enables one to laser scribe both sides of workpiece 11' with good alignment and fast throughput since both sides are scribed simultaneously.
2. During manufacturing, one actually provides four scribe marks: marks 10a and 10b, defining the outer diameter of the glass substrate, and scribe marks 10c and 10d defining the inner diameter of the glass substrate. These scribe marks must be concentric. Because of the manner in which workpiece 11' is mounted and rotated, one can easily achieve good concentricity. This is difficult to achieve if workpiece 11' is mounted on a x-y stage.
3. One can achieve good dimensional tolerance, e.g. less than about plus or minus $25 \mu m$, whereas typical x-y stages moving a workpiece in a circle achieve a tolerance of about $60 \mu m$. (A tolerance of $60 \mu m$ is outside the requirements for most magnetic disk applications.)
4. One can laser scribe workpiece 11' more rapidly by rotating it during scribing than if an x-y stage is used.
5. It is believed that a spindle-based system which rotates workpiece 11' will become important for the disk industry because x-y stage machines have difficulty (i.e. low yield and low throughput) in meeting the strict dimensional tolerances required in hard disk drives.

After workpiece 11' is laser scribed, workpiece 11' is subjected to an etching solution, which turns ridges 10a, 10b into grooves 12a, 12b (FIG. 9). Thereafter, portions 11a and 11b of workpiece 11' are separated at the location of grooves 12a, 12b.

In one embodiment, workpiece 11' is separated into individual pieces by etching grooves 12a, 12b sufficiently deeply so that grooves 12a, 12b nucleate sharp cracks that extend to join one another. In another embodiment, other techniques are employed to supply the driving force to initiate cracking and finally breaking the glass along the scribe mark. There are two types of methods that can be employed: mechanical and thermal. Mechanical methods involve applying a load at or near the scribe mark. Mechanical methods can be as simple as using a pair of pliers, or can involve designing a jig that applies a load equally distributed around the entire surface of the product piece or the waste piece.

Thermal techniques generate the load necessary to initiate cracking by applying either differential heating or cooling between the product piece and the waste piece. Practical methods of applying heating/cooling to specific areas include jets of cold air (e.g. vapor from liquid nitrogen) or localized heating/cooling through physical contact with a heated/cooled material such as metal. Thermal shocking through heat-quench cycles may also suffice to impart the necessary driving force for crack initiation.

As mentioned above, in one embodiment, the above technique is used to cut workpiece 11' into glass substrates, e.g. substrate 14 (FIG. 10). In addition, the above technique is used to remove a centrally located circular portion of substrate 14, thereby leaving a hole 16. Hole 16 is defined by scribe marks 10c, 10d described above. Hole 16 is subsequently used to mount the resulting magnetic disk on a spindle that is driven by a motor.

Because of the manner in which substrate 14 is formed, it has the following important characteristics.

1. Corners 17 of substrate 14 (both at the inner and outer diameter) are rounded and smooth. (Corners 17 are shown in FIG. 10A, which is a magnified cross section view of the edge of substrate 14.) The substrate need not be chamfered, although in some embodiments, the substrate is chamfered. (An embodiment using a laser and etching technique to form a chamfer is described below).
2. The position of the edges is precisely controlled. (This is for reasons described below.)
3. Few if any glass particles are generated during the process.
4. The edges of the substrate are smoother than the edges of substrates after prior art scribing and breaking.

After forming workpiece 11 into substrate 14, substrate 14 may optionally be subjected to an edge polish. If edge polishing is necessary, this polish is much less rigorous than prior art polishing techniques, because the position of the edges of substrate 14 are more precisely located, and smoother than edges of substrates formed using prior art scribing and breaking.

In another embodiment, instead of using conventional polishing techniques to smooth substrate 14, substrate 14 can be subjected to additional chemical etching, e.g. using an acidic aqueous fluoride-containing solution, to eliminate any jagged regions of the edge of substrate 14. See, for example, the above-incorporated '140 application.

Thereafter, substrate 14 is formed into a magnetic disk. This is accomplished by applying one or more underlayers 18 (typically one or more of Cr, a Cr alloy, NiP or NiAl), a magnetic layer 20 (typically a Co alloy or a Fe alloy) and a protective overcoat 22 on both sides of substrate 14, thereby forming a magnetic disk 24 (shown in cross section in FIG. 11). These layers can be formed by sputtering. Details concerning the sputtered layers on a magnetic disk are discussed in U.S. patent application Ser. No. 08/984,753, filed by Bertero et al. on Dec. 4, 1997, incorporated herein by reference.

In one embodiment, underlayer 18 is 15 to 20 nm thick. A thin CoCrTa layer (e.g. about 2 nm thick) is provided on the underlayer, a 17 nm thick CoCrPtTa magnetic layer 20 is formed on the CoCrTa layer, a 7 nm thick carbon protective overcoat 22 is formed on the magnetic layer, and a 1.5 to 2 nm thick lubricant layer is applied to the carbon layer.

The disk is typically mounted on a spindle 26 within a disk drive 28 (FIG. 12). The disk drive typically comprises a motor 30 for rotating spindle 26 (and therefore rotating disk 24), a pair of read-write heads 32a, 32b for reading data from and writing data to magnetic disk 24, a pair of suspension arms 34a, 34b for holding heads 32a and 32b, respectively, and an actuator (not shown) for controlling the position of suspensions arms 34a, 34b (and therefore heads 32a, 32b) relative to the disk 24.

The advantages of a method in accordance with the invention can be appreciated by considering prior art scribing and breaking techniques used to cut glass. Referring to FIG. 13, a portion P of a glass workpiece 40 exposed to the laser is relatively wide. If one tries to break workpiece 40 after laser scribing, a fracture will tend to propagate from somewhere within portion P. However, one cannot generally predict the exact point where the fracture will originate. Further, different defects or voids within workpiece 40 ensure that the fracture lines will not be perfectly straight. Thus, the edges of workpiece 40 (after breaking) will be jagged.

As mentioned above, it is preferred to laser scribe both sides of workpiece 11' and then etch workpiece 11'. This provides the following advantages. If one applied a laser to one side of the workpiece and etched the workpiece, the resulting structure would be workpiece 40', including a groove 46 (FIG. 14). Upon trying to break workpiece 40', one could be reasonably certain that the workpiece would fracture along a line originating at groove 46. However, it is possible that the fracture line would be jagged, e.g. like line 48 of FIG. 14. This is because there may be voids or defects (such as defect 50) randomly present in workpiece 40', and fracture line 48 would tend to form between groove 46 and defect 50). Therefore, merely applying a laser beam to one side of workpiece 40' and etching the workpiece would not necessarily result in the precise edges that are particularly desirable in a magnetic disk substrate.

Accordingly, it is preferred to laser texture and etch both sides of a workpiece (e.g. workpiece 40" of FIG. 15), and then break workpiece 40" into separate portions. This ensures that workpiece 40" will fracture along a line 52 between a groove 46 (FIG. 15) on the top surface of the workpiece and a groove 54 on the bottom surface of the workpiece. Therefore, the edges of the glass pieces formed from workpiece 40" will be more precise.

While it is preferred to laser scribe and etch both sides of the workpiece, in other embodiments of the invention, only one side of the workpiece is scribed and etched.

Embodiment Providing a Chamfer

In one embodiment of the invention a chamfer is provided at the edge of a substrate during the step of etching. Chamfers are typically formed on magnetic disk substrates, e.g. chamfer 60 formed on substrate 62, shown in FIG. 16. In the prior art, chamfers are formed by a grinding and polishing process. The grinding inflicts damage (specifically microcracks) on the substrate material, necessitating a considerable amount of lapping and polishing to remove the damage. Without additional lapping and polishing, the chamfered workpiece would be much weaker mechanically due to the microcracks. In one embodiment of the invention, chamfers are formed in the substrate during the process of applying a laser beam to a substrate and then etching the substrate. Specifically, as seen in FIG. 17, V-shaped grooves 70 are formed in a workpiece 71 as a result of the above-described steps. After the substrate is separated from the rest of workpiece 71, walls 72, 73 of V-shaped grooves 70 serve as a chamfer. Of importance, the chamfer is formed without requiring the expense of additional grinding and polishing steps. The V-shaped profile can be facilitated in numerous ways, e.g. controlling the intensity profile of the laser beam applied to the glass, controlling the location within the glass that serves as a focus point for the laser, etc.

Another advantage of the present invention is that prior art chamfering techniques (grinding and polishing) generate glass particles. These particles can cause problems during subsequent processes, e.g. scratching the surface of the glass substrate, or otherwise contaminating subsequent processing. Providing a chamfer using the method of the present invention avoids these problems.

Embodiment Facilitating Improved Flatness After Polishing

Another advantage of the invention is that it makes production of a polished substrate easier. In the prior art, it was necessary to subject glass substrates to rigorous polishing. This sometimes resulted in an undesired surface profile at the edge of the disk. One such undesired profile is a bump such as bump 80 at the edge 82 of substrate 84, sometimes known as a "ski jump" (FIG. 18). Another undesired profile is a sloped region 86 at the edge of substrate 88, sometimes known as "roll-off" (FIG. 19). In one embodiment of the invention, glass is polished while it is in the form of a glass square (e.g. square 90 of FIG. 20). Therefore, any undesired surface profile artifacts are away from the portion of the glass that will ultimately become the glass substrate. For example, any undesired surface profile artifacts formed during polishing will be at periphery 92 of glass square 90. After glass substrate 94 is separated from square 90 using the method of the present invention, periphery 92 of square 90 is removed, and any surface profile artifact in periphery 92 does not represent a problem in the manufacture of a magnetic disk, no matter how severe the surface profile artifact.

The above-mentioned process has several advantages over the prior art. For example, PCT Patent Application WO 98/17434 discusses forming a circular glass workpiece having three circular, concentric laser-induced scribe lines, i.e. at diameters of 20, 65 and 75 mm. The innermost scribe line defines the inner diameter of a substrate, the middle scribe line defines the outer diameter of the substrate, and the third scribe line marks a line which separates the circular workpiece from a surrounding glass plate. After separating the workpiece along the third scribe line from the rest of the plate, the workpiece is polished. Thereafter, the glass substrate is separated along the first and second scribe lines to form a circular substrate, and any polishing artifacts are on an outer band of glass that is thrown out. In contrast, in this embodiment of the invention, it is not necessary to form three circular concentric laser-induced scribe lines. For example, one can form only two such scribe lines. Therefore, this embodiment is simpler, more efficient and less costly than the WO 98/17434 process.

While the above-described embodiment does not require forming three concentric scribe lines in a workpiece, in other embodiments of the invention, such scribe lines are formed in the workpiece.

In the above-described embodiment, one typically does not polish the substrate after separating the substrate is separated from the workpiece. However, one can lightly polish the substrate after separating the substrate from the rest of the workpiece without creating the above-mentioned periphery artifacts. Such a light polishing process is discussed in U.S. patent application Ser. No. 09/262,365, filed Mar. 4, 1999 by Bajorek et al., incorporated herein by reference.

In the above-described embodiment, periphery artifacts are typically caused by polishing the workpiece. However, as mentioned above, in another embodiment, the workpiece is not polished prior to separating the workpiece into a substrate.

Embodiment Using a Protective Layer

In one embodiment, prior to laser scribing, we form a protective overcoat 100 over square 90 (FIG. 21). Protective overcoat 100 protects the underlying glass from being damaged by rubbing against glass chips during breaking. Although the process of the present invention produces fewer such chips than prior art scribing and breaking processes, such chips can nonetheless be present, and overcoat 100 prevents such chips, or other particles, from scratching the surface of the glass. Also, as described below, overcoat 100 provides other advantages.

During laser scribing, the portion of overcoat 100 exposed to the laser beam typically burns away, thereby exposing a portion of the glass where the ridges are formed. During etching, the remaining portion of overcoat 100 can act like a lithographic mask, preventing the main surface of the glass from etching. Overcoat 100 can also ensure that a desired edge profile of the glass substrate.

In one embodiment, the protective overcoat 100 is an organic material such as ethylcellulose. In yet another embodiment, protective overcoat is an inorganic water-soluble material.

While the invention has been described with respect to a specific embodiment, those skilled in the art will recognize that changes can be made in form and detail without departing from the spirit and scope of the invention. For example, different numbers of magnetic layers or underlayers can be formed on a substrate to manufacture a magnetic disk in accordance with the invention. Also, the method of the present invention can be used to cut glass in other industrial applications, e.g. LCDs. Laser beams having a power or beam size outside the above-described ranges can be used. Lasers having the characteristics described in the above-mentioned '220 patent, or lasers having the parameters, characteristics and power density discussed in U.S. Pat. No. 5,609,284 can be used. (The '284 patent is incorporated herein by reference.) Preferably, the laser power should not be such as to ablate the glass.

Different techniques can be used to break the glass workpiece. In one embodiment, a mechanism as described in Japanese laid open publication 7-223828, dated Aug. 22, 1995, incorporated herein by reference, can be used. Accordingly, all such changes come within the invention.

We claim:

1. A method comprising:

applying a beam of radiant energy to a first side of a portion of a workpiece, said radiant energy forming a protrusion at the location where said radiant energy is applied to said workpiece;

etching said workpiece to form a groove where said radiant energy was applied to said workpiece; and separating said workpiece into separate regions along said groove.

2. Method of claim 1 wherein said beam is a laser beam and said workpiece contains silica.

3. Method of claim 1 wherein said workpiece is glass.

4. Method of claim 1 wherein said workpiece is glass-ceramic.

5. Method of claim 1 wherein said act of etching comprises applying an aqueous acidic solution comprising fluoride ions to said workpiece.

6. Method of claim 1 wherein said workpiece is formed into a substrate, said method further comprising the acts of applying a magnetic layer to said substrate.

7. Method of claim 6 further comprising the acts of applying an underlayer between said substrate and said magnetic layer, and forming a protective layer on said magnetic layer.

8. Method of claim 1 wherein at least a portion of said groove has a sloped wall.

9. Method of claim 8 further comprising forming a chamfer at an edge of at least one of said regions, wherein said sloped wall forms at least a portion of said chamfer.

10. Method of claim 1 further comprising polishing said workpiece prior to said step of applying.

11. Method of claim 10 wherein the periphery of said workpiece is separated from a central portion of said workpiece, and wherein polishing artifacts present at the periphery of said workpiece are not present in the central portion of said workpiece.

12. Method of claim 1 further comprising the act of applying a protective layer to said workpiece prior to said act of applying.

13. Method of claim 12 wherein said protective layer protects said workpiece from exposure to an etchant during said act of etching.

14. Method of claim 1 wherein the etch rate of said protrusion is greater than the etch rate of the remainder of said workpiece.

* * * * *

UNITED STATES PATENT AND TRADEMARK OFFICE
CERTIFICATE OF CORRECTION

PATENT NO.     : 6,664,503 B1
DATED          : December 16, 2003
INVENTOR(S)    : Hsieh et al.

It is certified that error appears in the above-identified patent and that said Letters Patent is hereby corrected as shown below:

<u>Title page, Item [54] and Column 1, line 1,</u>
Title should read -- [54] METHOD FOR MANUFACTURING A MAGNETIC DISK COMPRISING A GLASS SUBSTRATE --

Signed and Sealed this

Sixteenth Day of March, 2004

JON W. DUDAS
*Acting Director of the United States Patent and Trademark Office*